(12) United States Patent
Nishizawa et al.

(10) Patent No.: US 7,434,458 B2
(45) Date of Patent: Oct. 14, 2008

(54) UNIVERSAL SPRING MECHANISM FOR AUTOMOBILE SUSPENSION SYSTEM DESIGN

(75) Inventors: Shinichi Nishizawa, Novi, MI (US); Jason Logsdon, Farmington, MI (US)

(73) Assignee: NHK International Corp., Wixom, MI (US)

(*) Notice: Subject to any disclaimer, the term of this patent is extended or adjusted under 35 U.S.C. 154(b) by 377 days.

(21) Appl. No.: 11/132,364

(22) Filed: May 19, 2005

(65) Prior Publication Data

US 2005/0211514 A1 Sep. 29, 2005

Related U.S. Application Data

(62) Division of application No. 10/817,981, filed on Apr. 6, 2004, now Pat. No. 7,110,926.

(60) Provisional application No. 60/514,896, filed on Oct. 29, 2003.

(51) Int. Cl.
*G01L 1/04* (2006.01)
*G06G 7/48* (2006.01)

(52) U.S. Cl. ............................. 73/161; 703/7

(58) Field of Classification Search ............. 73/161, 73/11.04–11.09; 703/7, 8
See application file for complete search history.

(56) References Cited

U.S. PATENT DOCUMENTS

| | | | |
|---|---|---|---|
| 4,415,146 A * | 11/1983 | Sitko | 267/96 |
| 5,163,015 A | 11/1992 | Yokota | |
| 5,249,151 A | 9/1993 | Chang et al. | |
| 5,253,189 A | 10/1993 | Kramer | |
| 5,297,057 A | 3/1994 | Kramer et al. | |
| 5,404,289 A * | 4/1995 | Hang et al. | 700/55 |
| 5,623,642 A | 4/1997 | Katz et al. | |
| 5,654,900 A | 8/1997 | Ratner | |
| 5,901,072 A | 5/1999 | Shimmell | |
| 5,913,955 A | 6/1999 | Redmond et al. | |
| 5,920,491 A | 7/1999 | Hibbitt et al. | |
| 5,956,500 A | 9/1999 | Shimmell | |

(Continued)

OTHER PUBLICATIONS

Development of L-Shape Coil Spring to Reduce a Friction on the McPherson Strut Suspension System, Toshio Hamano et al, SAE 2001 World Congress, Detroit, Michigan, Mar. 5-8, 2001.*

(Continued)

*Primary Examiner*—Edward Lefkowitz
*Assistant Examiner*—Octavia Davis
(74) *Attorney, Agent, or Firm*—Dykema Gossett PLLC

(57) ABSTRACT

A method for determining coil spring force line range corresponding to specific damper friction values using a universal spring mechanism and using the determined force line range in coil spring design. The method includes securing the mechanism to a suspension system including a damper, providing a controller for controlling actuator legs thereof for exerting force between upper and lower seats of the mechanism, and performing a capability study of the mechanism. The method further includes determining a desired coil spring force line position based upon the capability study, activating the mechanism to generate a desired coil spring force line based upon the desired coil spring force line position, performing damper friction measurements for determining a coil spring force line position for minimizing damper friction, determining the coil spring force line range based upon the damper friction measurements, and designing a coil spring based upon the coil spring force line range.

3 Claims, 17 Drawing Sheets

U.S. PATENT DOCUMENTS

| | | |
|---|---|---|
| 6,023,574 A | 2/2000 | Tangren |
| 6,044,210 A | 3/2000 | Nagtegaal |
| 6,063,126 A | 5/2000 | Borduin |
| 6,077,302 A | 6/2000 | Kumra et al. |
| 6,081,654 A | 6/2000 | Morman et al. |
| 6,132,108 A | 10/2000 | Kashiwamura et al. |
| 6,161,080 A | 12/2000 | Aouni-Ateshian et al. |
| 6,178,540 B1 | 1/2001 | Lo et al. |
| 6,224,249 B1 | 5/2001 | Ozawa et al. |
| 7,185,867 B2 * | 3/2007 | Hill et al. .................... 248/421 |
| 2001/0020386 A1 | 9/2001 | Mancosu et al. |
| 2001/0032065 A1 | 10/2001 | Fujita |
| 2003/0111309 A1 * | 6/2003 | Nishizawa et al. ........ 188/299.1 |

OTHER PUBLICATIONS

Modeling of Coil Springs Using Parallel Mechanisms, Shinichi Nishizawa et al., Society of Automotive Engineers, Inc., 2000.

* cited by examiner

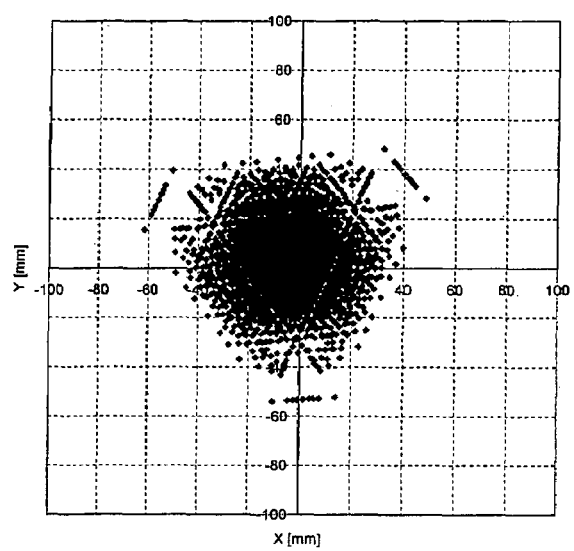 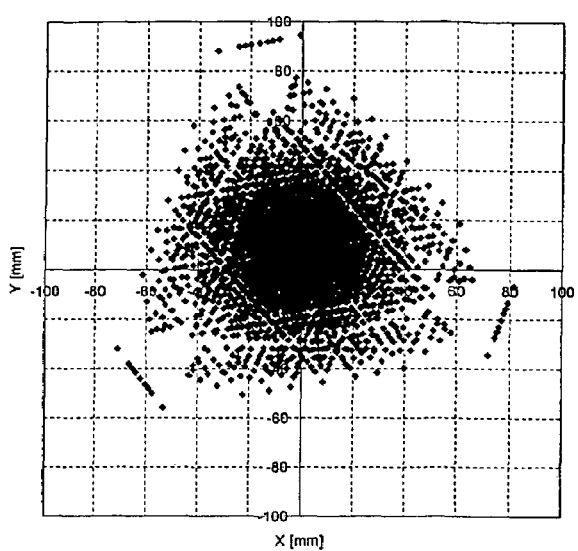
Fig. 8 (a)                    Fig. 8 (b)

UNIVERSAL SPRING MECHANISM FOR AUTOMOBILE SUSPENSION SYSTEM DESIGN

RELATED APPLICATIONS

This application claims benefit of priority of Provisional Application Ser. No. 60/514,896, filed Oct. 29, 2003, and further claims the priority of parent application Ser. No. 10/817,981, filed Apr. 6, 2004, now U.S. Pat. No. 7,110,926.

BACKGROUND OF INVENTION a. Field of Invention

The invention relates generally to suspension system design for automobiles and the like, and, more particularly to a method and apparatus for finding a coil spring force line range which corresponds to specific damper friction values using a universal spring mechanism, and using the determined force line range in coil spring design methods.

b. Description of Related Art

Conventionally, a suspension coil spring force line position specification is determined from methods using Statics theories and/or mechanical simulation software such as ADAMS. These methods result in a single ideal force line position for a simplified model. Since it is virtually impossible to avoid manufacturing variability with regard to force line position, the force line specification should preferably be a range that takes into account manufacturing variability, and not just an ideal position. Furthermore, ideally the range would be determined experimentally, which would be more accurate than using simple Statics calculations or simulations that require simplified models and assumptions. If the coil spring design needs to limit the damper friction to a certain level from a riding comfort or durability standpoint, an allowable spring force line position range needs to be determined by correlating actual damper friction to force line offset and/or force line inclination. When using simulation software for this purpose, results are invariably dependent on the friction coefficient used for the simulation. Moreover, today's suspension coil spring designs require not only taking into account the one-dimensional force along the coil spring axis, but also require accounting for the exertion of a complex multi-dimensional force and torque field between the spring seats.

Based upon the aforementioned factors and concerns, there remains a need for a method and apparatus for finding a coil spring force line range which is structurally and economically feasible to manufacture and utilize, and a system which efficiently and reliably determines a coil spring force line range for today's complex suspension coil spring designs which are susceptible to one-dimensional forces along the coil spring axis as well as complex multi-dimensional force and torque fields between the spring seats.

SUMMARY OF INVENTION

The invention solves the problems and overcomes the drawbacks and deficiencies of prior art suspension coil spring design systems by providing a novel method and apparatus for finding a coil spring force line range which corresponds to specific damper friction values using a 6-degree-of-freedom (DOF) parallel mechanism, hereinafter referred to as a "universal spring mechanism," and using the determined force line range in coil spring design methods.

The present invention thus describes the design of the universal spring mechanism which mimics the force and torque characteristics of a coil spring. This mechanism physically generates the 6-DOF force and torque field of a coil spring, allowing for the experimental evaluation of the quasi-static force effects of a coil spring while at the design stage. Moreover, the universal spring mechanism according to the present invention may be readily used to investigate the relationship between spring characteristics and damper friction. The invention yet further describes a method for damper friction measurement by a newly developed testing system including the universal spring mechanism.

The present invention thus provides a method for determining coil spring force line range corresponding to specific damper friction values using a universal spring mechanism and using the determined force line range in coil spring design. The method may include securing the universal spring mechanism to a suspension system including a damper, providing a controller for controlling at least three actuator legs of the universal spring mechanism for exerting force between upper and lower seats of the mechanism, and performing a capability study of the universal spring mechanism. The method may further include determining a desired coil spring force line position based upon the capability study, activating the universal spring mechanism to generate a desired coil spring force line based upon the desired coil spring force line position, performing damper friction measurements for determining a coil spring force line position for minimizing damper friction, determining the coil spring force line range based upon the damper friction measurements, and designing a coil spring based upon the coil spring force line range.

For the method described above, the controller may be a controller including an integrator element for reducing a steady state position error of a response of the universal spring mechanism to zero, a Lead-Lag controller, and/or a controller including a Smith-predictor. Preferably, the controller may be a PI+Lead-Lag-controller with a Smith Predictor. For the method steps described above, the capability study of the universal spring mechanism may be performed such that a scannable coil spring force line position range for a given spring is large enough to cover a desired coil spring force line position range for a specific application. Moreover, performing the capability study may include calculating a realizable coil spring force line by scanning forces and torques generated by the universal spring mechanism, and adjusting mounting areas of at least one of the upper and lower seats if the coil spring force line position range is too large or too small. The method may further include computing a total force field based upon the desired coil spring force line position and dimensional configuration of the universal spring mechanism. For the method described above, performing the damper friction measurements may include inputting an oscillation to the suspension system, evaluating damper friction for a range of coil spring force line positions, and selecting an optimal coil spring force line position or a range of coil spring force line positions for minimizing damper friction by sweeping upper and lower positions through a predetermined range.

The method may further include evaluating hysteresis in an output of a load cell mounted on the actuator leg to determine the damper friction. For the method described above, determining the coil spring force line range may include evaluating a three-dimensional plot of damper friction, and selecting a range of coil spring force line positions below a predetermined acceptable damper friction. Alternatively, determining the coil spring force line range may include evaluating a friction contour map of damper friction, the map including information regarding offset and inclination of the coil spring force line range, and selecting a range of coil spring force line positions below a predetermined acceptable damper friction.

Yet further, determining the coil spring force line range may include evaluating damper friction as a function of offset and inclination of the coil spring force line range, and selecting a range of coil spring force line positions below a predetermined acceptable damper friction. For the method described above, the method may be used for experimental investigation of static and dynamic characteristics of a coil spring.

The invention yet further provides a system for determining coil spring force line range corresponding to specific damper friction values using a mechanism having spaced apart moveable platforms and a plurality of actuable links interconnecting the platforms at corresponding joints on opposite ends of each link, and using the determined force line range in coil spring design. The system may include a structure for securing the mechanism to a suspension system including a damper, a controller for controlling at least three of the links of the mechanism for exerting force between upper and lower platforms of the mechanism, and a system for performing a capability study of the mechanism. The system for determining coil spring force line range may further include a system for determining a desired coil spring force line position based upon the capability study, a system for performing damper friction measurements for determining a coil spring force line position for minimizing damper friction, and a system for determining the coil spring force line range based upon the damper friction measurements.

For the system described above, the controller may be a controller including an integrator element for reducing a steady state position error of a response of the universal spring mechanism to zero, a Lead-Lag controller, and/or a controller including a Smith-predictor. The system for performing the damper friction measurements may include a system for inputting an oscillation to the suspension system, a system for evaluating damper friction for a range of coil spring force line positions, and a system for selecting an optimal coil spring force line position or a range of coil spring force line positions for minimizing damper friction by sweeping upper and lower positions through a predetermined range. The system for determining coil spring force line range may also include a load cell mounted on the links for determining the damper friction, a system for evaluating a three-dimensional plot of damper friction, and a system for selecting a range of coil spring force line positions below a predetermined acceptable damper friction. Alternatively, the system for determining the coil spring force line range may include a system for evaluating a friction contour map of damper friction, the map including information regarding offset and inclination of the coil spring force line range, and a system for selecting a range of coil spring force line positions below a predetermined acceptable damper friction. Yet further, the system for determining the coil spring force line range may include a system for evaluating damper friction as a function of offset and inclination of the coil spring force line range, and a system for selecting a range of coil spring force line positions below a predetermined acceptable damper friction.

Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention as claimed.

BRIEF DESCRIPTION OF THE DRAWINGS

The accompanying drawings, which are included to provide a further understanding of the invention and are incorporated in and constitute a part of this specification, illustrate preferred embodiments of the invention and together with the detail description serve to explain the principles of the invention. In the drawings:

FIG. 8(a)-8(b) show exemplary graphs of the realizable force line position for the upper and lower sides, respectively;

DETAILED DESCRIPTION OF THE PREFERRED EMBODIMENTS

Figure 1A:
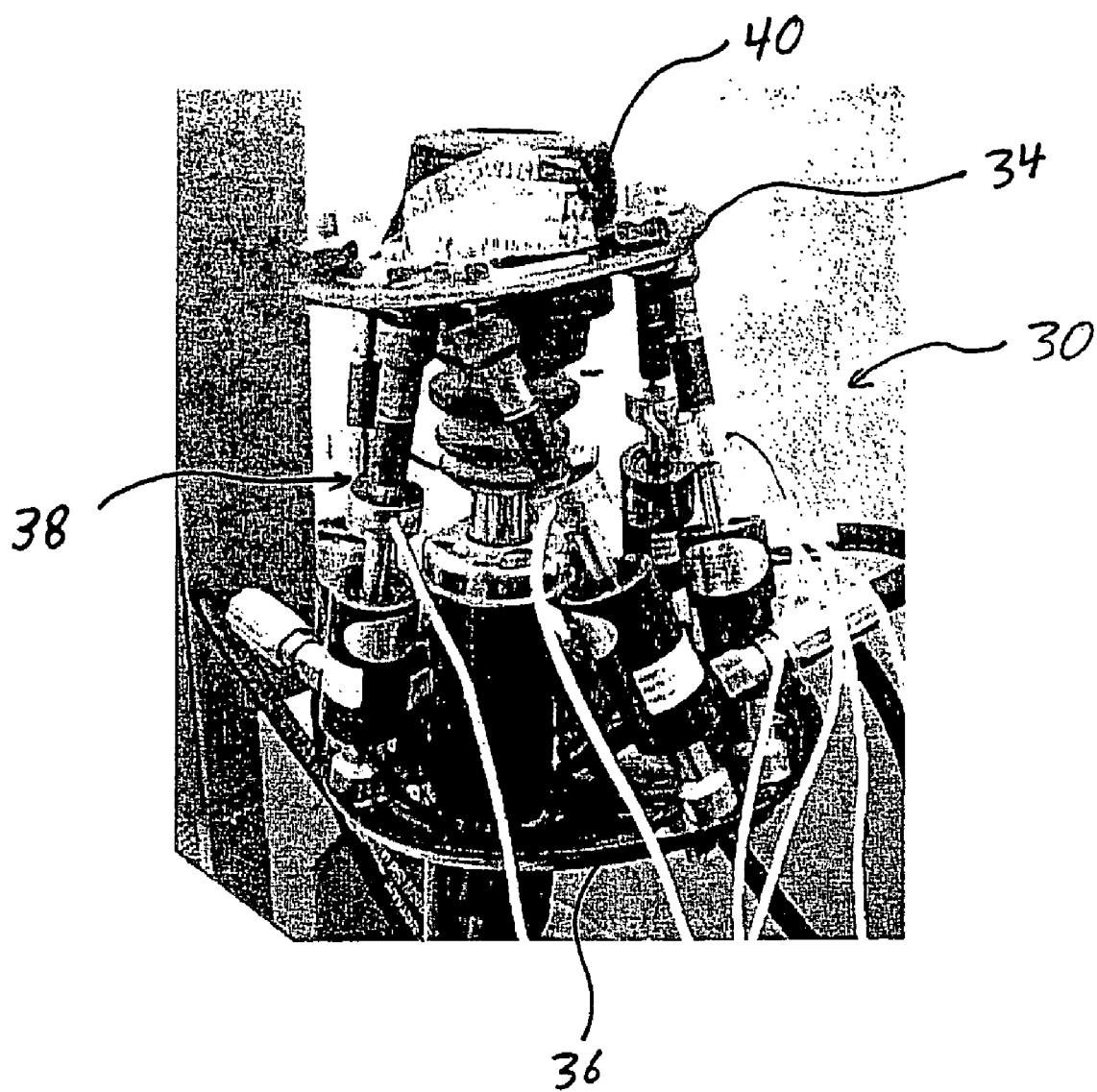
FIG. 1(a) is a schematic diagram of a universal spring mechanism according to the present invention mounted on a strut.

Referring now to the drawings wherein like reference numerals designate corresponding parts throughout the several views, FIGS. 1-15 illustrate components and schematic diagrams related to a universal spring mechanism according to the present invention, generally designated 30.

Universal spring mechanism 30 described in detail below has been similarly described in U.S. patent application Ser. No. 10/087,210, which is owned by the Assignee herein and the disclosure of which are incorporated herein by reference.

Referring to FIG. 1(a), the present invention describes universal spring mechanism 30 and a method of controlling mechanism 30 for determining the necessary force line range for a coil spring experimentally, without the requirement of making a prototype coil spring for a given application.

Figure 1B:
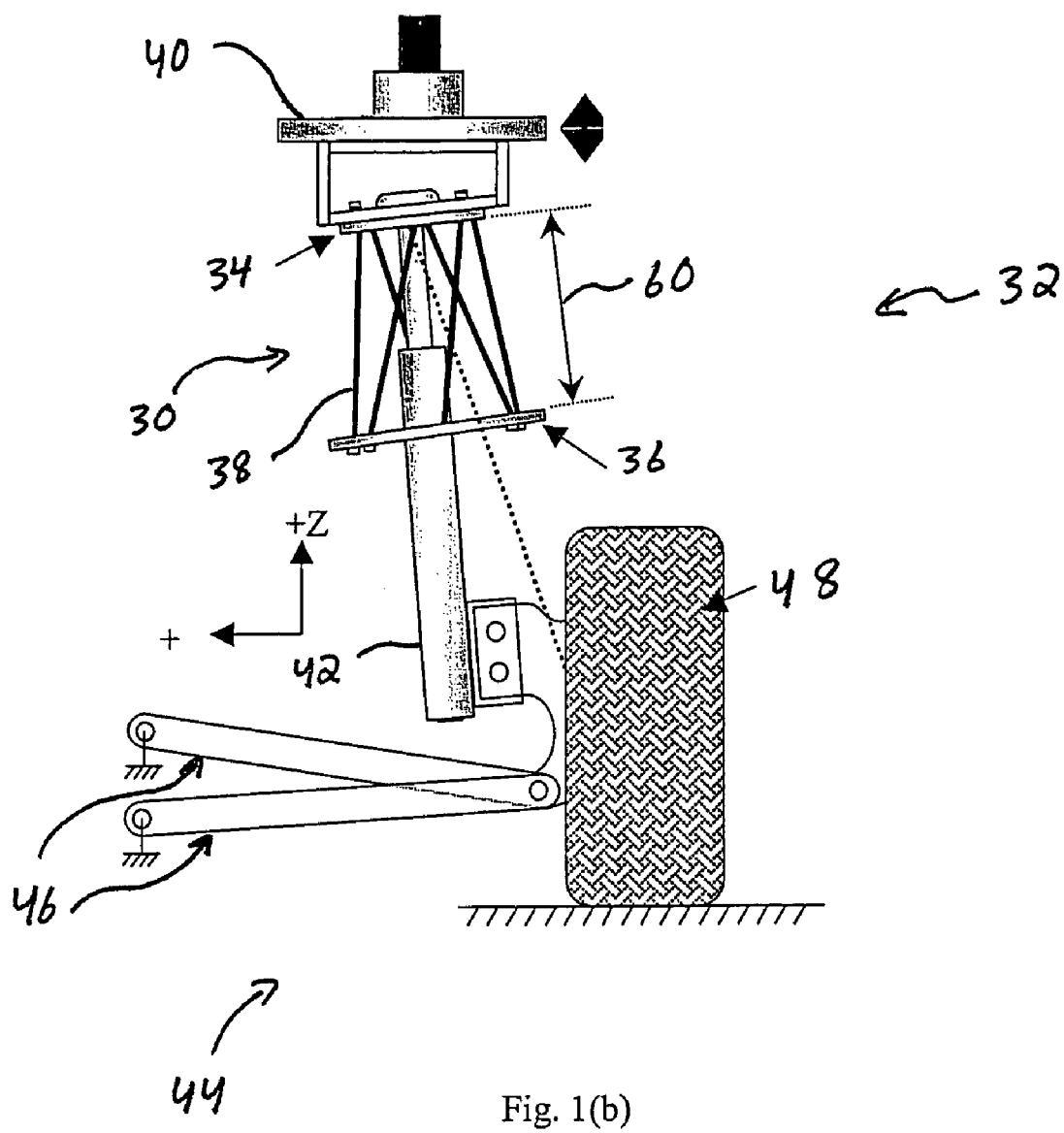
FIG. 1(b) is a schematic diagram of the universal spring mechanism of FIG. 1(a) illustrated in an installed configuration for damper friction measurement for a MacPherson Strut type suspension system.

As shown in FIGS. 1(a) and 1(b), universal spring mechanism 30 may be generally mounted on suspension system 32 instead of a coil spring. Mechanism 30 may generally include upper and lower seats 34, 36, respectively, and six actuator legs 38 disposed therebetween for applying force for determining the necessary force line range for the coil spring to be designed. Upper seat 34 may be operatively connected to load cell 40 and damper 42, which may be further connected to assembly 44 including arms 46 and tire 48. Actuator legs 38 may include a normal height 60.

Figure 1C:
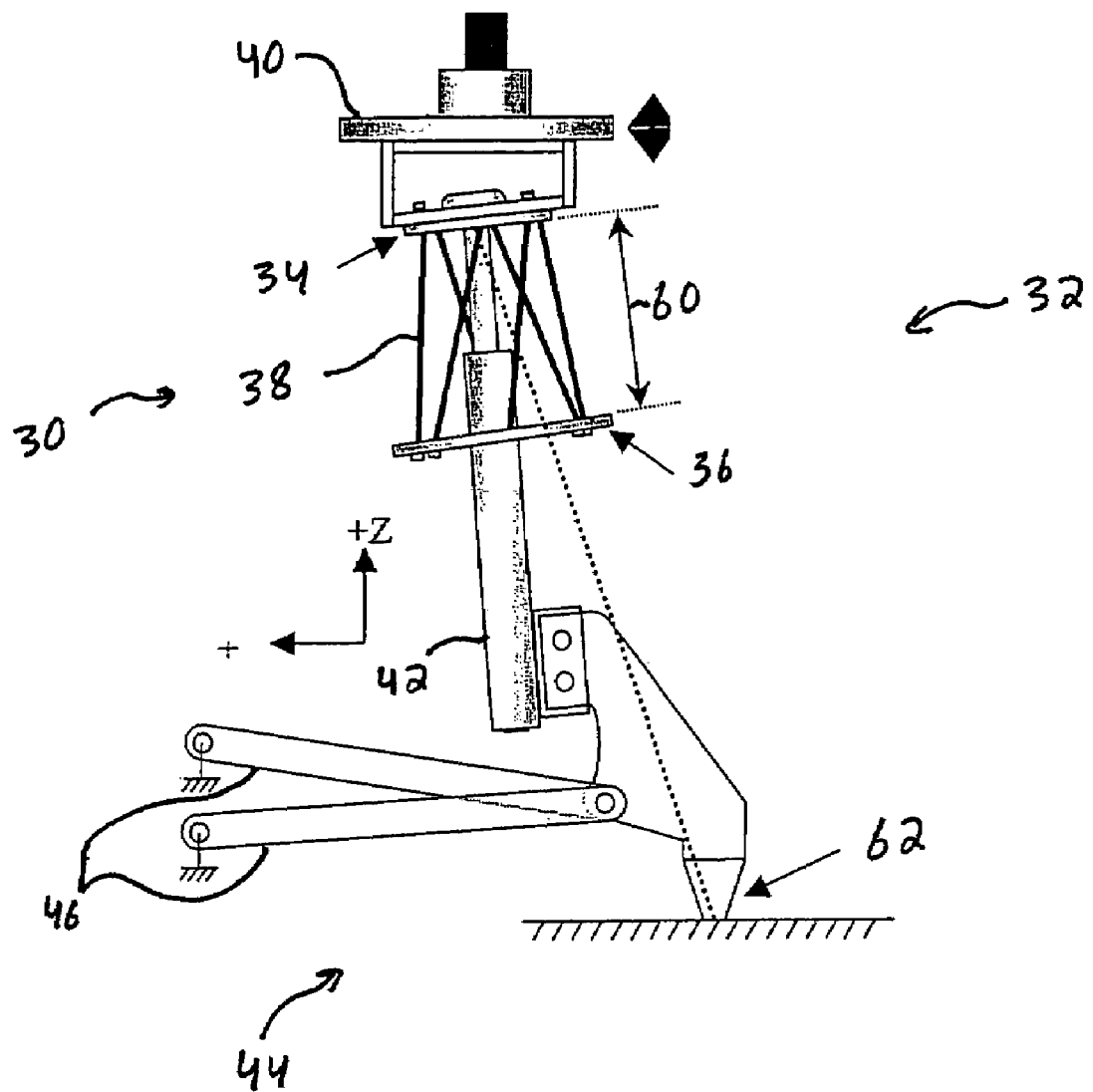
FIG. 1(c) is another simplified schematic diagram of the universal spring mechanism of FIG. 1(a) illustrated in an installed configuration for damper friction measurement for a suspension system.
Figure 1D:
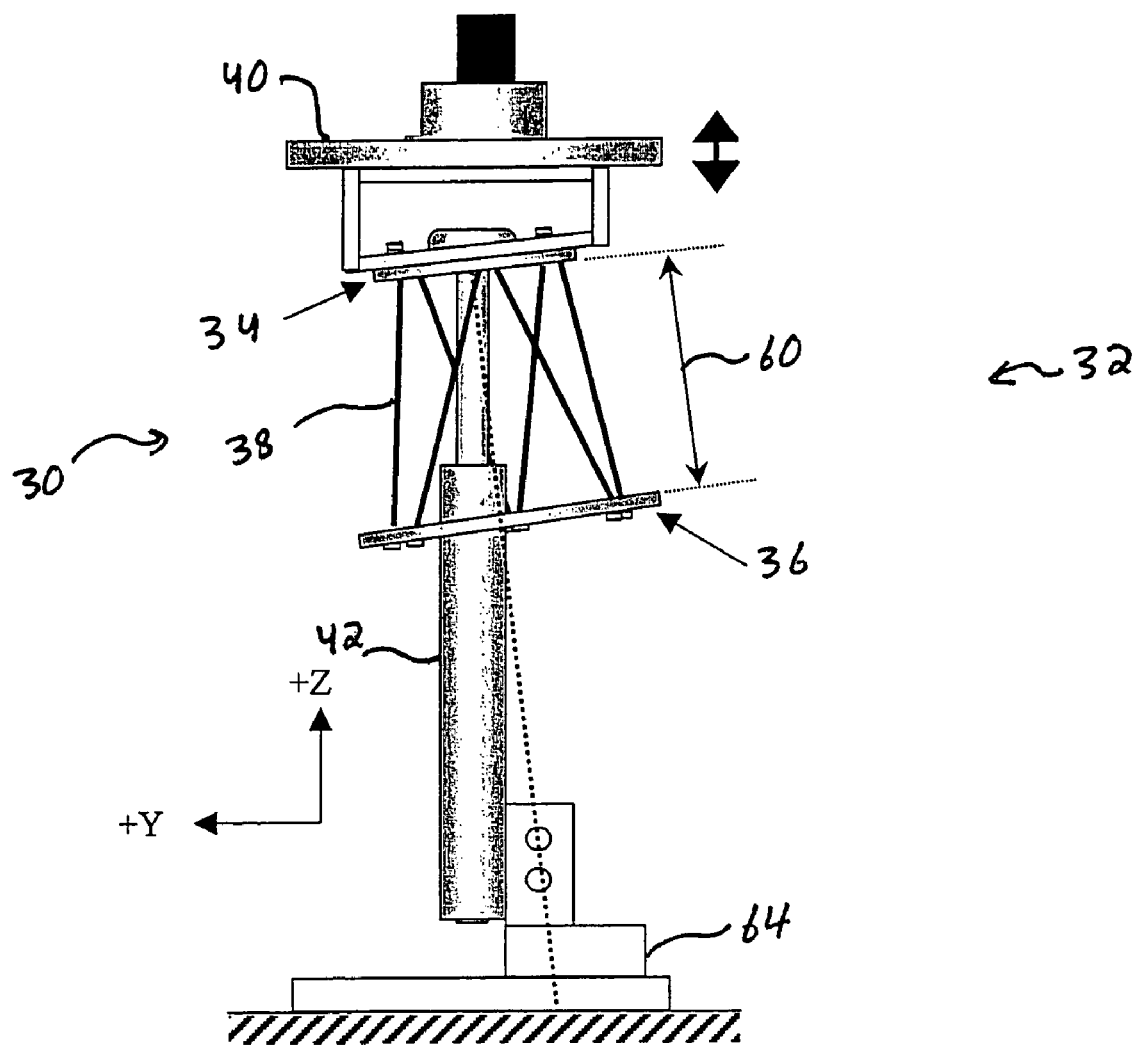
FIG. 1(d) is yet another simplified schematic diagram of the universal spring mechanism of FIG. 1(a) illustrated in an installed configuration for damper friction measurement for a suspension system.

While the experimental setup for damper friction measurement for FIG. 1(b) illustrates the case of a MacPherson Strut type suspension, damper friction measurement may be performed with either a full suspension assembly, as shown in FIG. 1(b), or by simplified assemblies such as the ones illustrated in FIGS. 1(c) and 1(d). For the simplified assemblies of FIGS. 1(c) and 1(d), tire 48 may be respectively replaced by a bearing 62 or fixture 64 for connection of damper 42 thereto. It should be noted that the experimental setups of FIGS. 1(b)-1(d) may be applied to any type of suspension system in place of a coil spring, such as coil-over shock applications for example.

Figure 2:
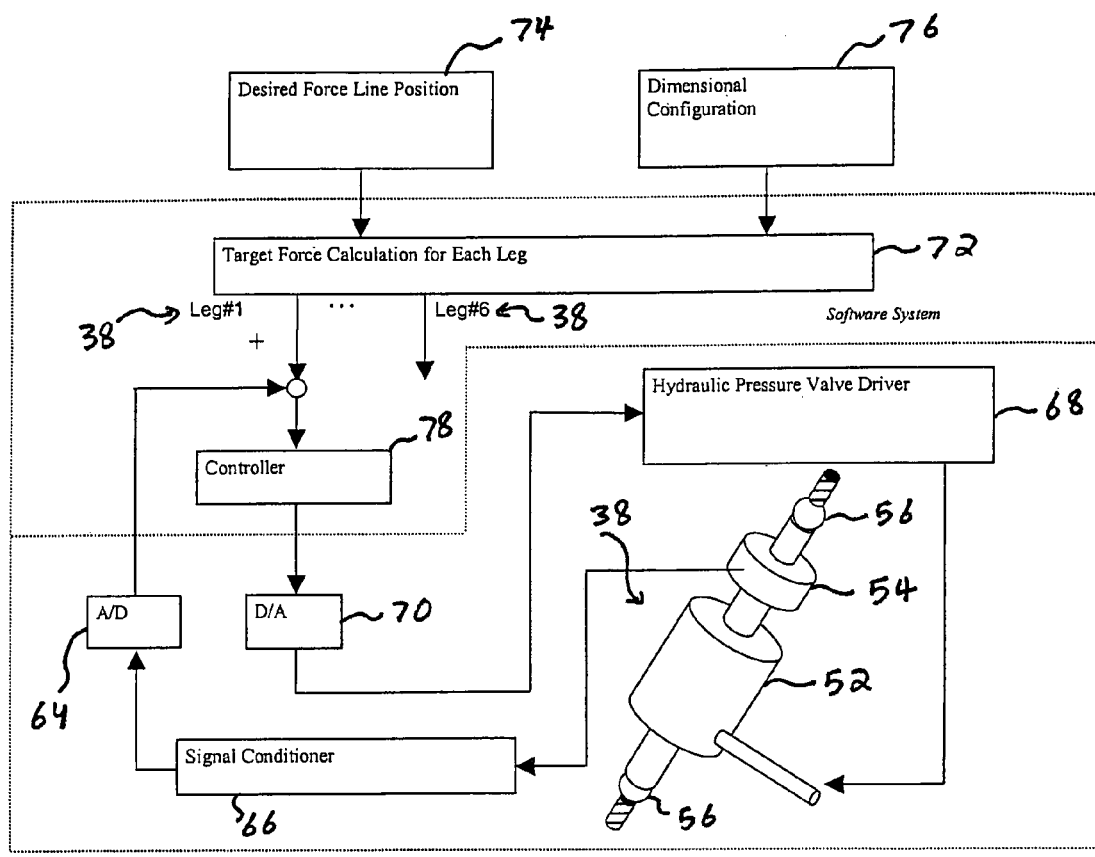
FIG. 2 is a flowchart illustrating an overview of the universal spring scheme according to the present invention.

Referring to FIGS. 1(a)-1(d), 2 and 3, the overview of the universal spring scheme is shown in FIG. 2. For FIGS. 1(a)-1(d), the set of 6-DOF forces between upper and lower seats 34, 36 of a McPherson suspension system is generated by six actuator legs 38. Each actuator leg 38 illustrated in FIGS. 2 and 3 may consist of a miniaturized custom made hydraulic cylinder 52, a load cell 54, and two ball joints 56. Kinematically, universal spring mechanism 30 requires 6-DOF, 3 translational and 3 rotational. Ball joints 56 may be used to install actuators legs 38 to any inclined seats (i.e. upper and lower seats 34, 36) to eliminate adverse moments on legs 38 and load cell 54. The use of two ball joints 56, instead of one ball joint and one universal joint, per leg 38 allows for an additional six degrees of freedom for the entire mechanism. These additional six degrees of freedom are present as the non-constrained rotational motion of actuator legs 38 along each central axis of hydraulic cylinder 52. These allowable rotations have virtually no influence towards the generation of force between upper and lower seats 34, 36. For practical use of mechanism 30, the unconstrained rotational motion of actuator legs 38 is beneficial in that it allows arrangement of all six hydraulic hoses from each cylinder in an organized manner.

Figure 3:
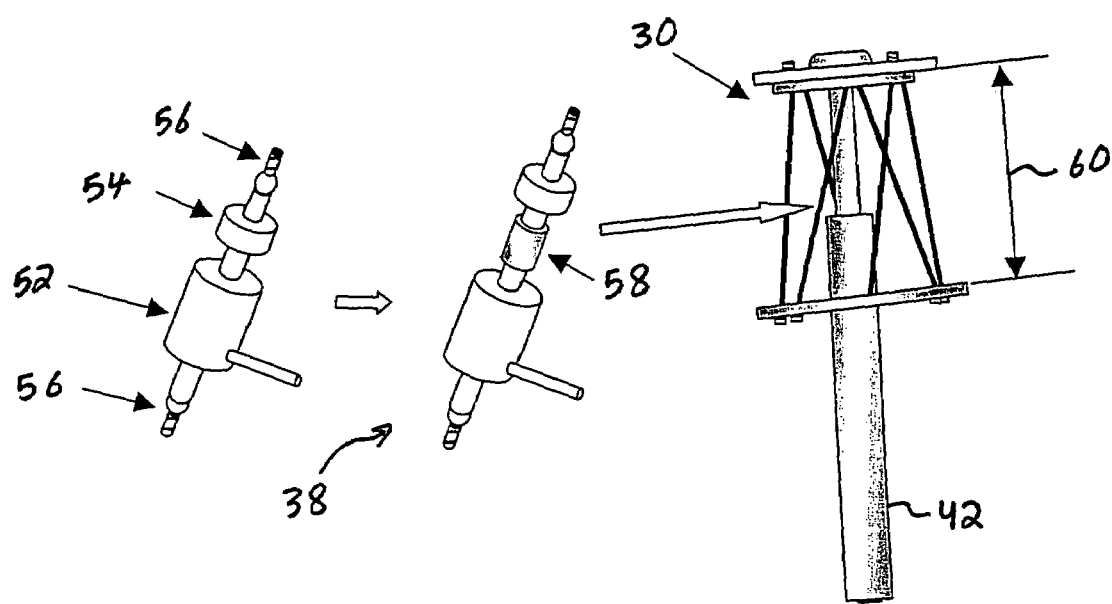
FIG. 3 shows schematic diagrams of the steps for inserting an extension onto an actuator leg of the universal spring mechanism of FIG. 1(a)

As shown in FIG. 3, the length of each actuator leg 38 may be adjusted using extension rods 58 installed between ball joints 56 and load cell 54.

Referring to FIG. 2, the force of each actuator leg 38 may be independently controlled by the closed-loop control scheme via controller 78 described in detail below. For the control scheme, generally, load cell 54 mounted on each actuator leg 38 may monitor the actual force acting along each leg 38. A voltage signal from load cell 54 may be amplified, filtered, and sent to an A/D (Analog/Digital) board 64 by signal coordinator 66. A voltage control signal may be determined by the proposed closed-loop control scheme with the target leg force calculated from the desired force line position and flow to proportional pressure valve driver 68 via a D/A (Digital/Analog) board 70. The pressure of hydraulic cylinder 52 may be directly controlled by proportional pressure control valves (not shown).

Referring to FIG. 2, target force calculation 72 for each actuator leg 38, based upon a desired force line position 74 and dimensional configuration 76, will now be described in detail. The parameters used below are defined in detail in reference to FIGS. 4(a)-4(c), for which the universal spring coordinate system is defined such that the center of the upper mounting positions is set to origin, z-axis is perpendicular to the upper mounting seat 34, and x-axis is in the same direction as the spring lower tip. From the desired force line position 74 and dimensional configuration 76 for the system, the target force for each leg 38 may be determined as follows.

Figures 4A, 4B, 4C:
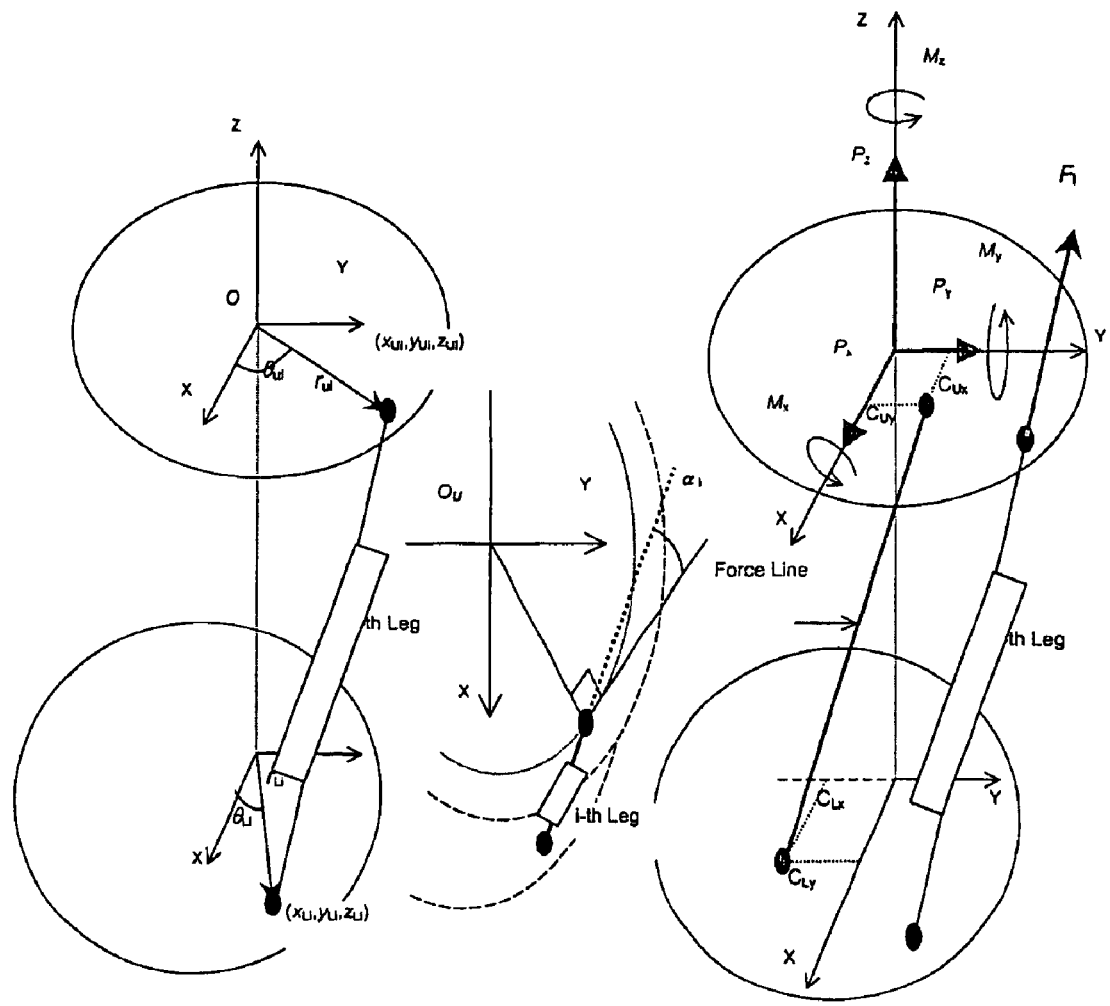
FIGS. 4(a)-4(c) are schematic diagrams of parameter symbol definitions according to the present invention.

Referring to FIGS. 4(a)-4(c), first, the unit vector of the i-th leg ($u_{ix}$, $u_{iy}$, $u_{iz}$) may be calculated under the universal spring coordinate system from Equation (1).

$$u_i = \frac{(x_{Ui} - x_{Li}, y_{Ui} - y_{Li}, z_{Ui} - z_{Li})}{\sqrt{(x_{Ui} - x_{Li})^2 + (y_{Ui} - y_{Li})^2 + (z_{Ui} - z_{Li})^2}} \quad \text{Equation (1)}$$

Total vertical force $P_z$ may be given by the sum of the z-component force of the six legs.

$$P_z = \sum_{i=1}^{6} F_i u_{iz} \quad \text{Equation (2)}$$

The center of gravity on both seats 34, 36 may be approximated as the force line position:

$$C_{Ux} = -\frac{1}{P_z} \sum_{i=1}^{6} F_i u_{iz} |r_{Ui}| \cos\theta_{Ui} \quad \text{Equation (3)}$$

$$C_{Uy} = -\frac{1}{P_z} \sum_{i=1}^{6} F_i u_{iz} |r_{Ui}| \sin\theta_{Ui} \quad \text{Equation (4)}$$

$$C_{Lx} = -\frac{1}{P_z} \sum_{i=1}^{6} F_i u_{iz} |r_{Li}| \cos\theta_{Li} \quad \text{Equation (5)}$$

$$C_{Ly} = -\frac{1}{P_z} \sum_{i=1}^{6} F_i u_{iz} |r_{Li}| \sin\theta_{Li} \quad \text{Equation (6)}$$

Since the moment about the force line axis does not influence the force line position, it may be set to any value regardless if it can even be realized by an actual spring. The moment about the Z-axis ($M_z$) may be produced mainly by the moment about the force line. Therefore, $M_z$ may also be set to any value. For the present case, with $M_z$ set to zero, the following equation results:

$$0 = \sum_{i=1}^{6} (-1)^i F_i \sqrt{u_{ix}^2 + u_{iy}^2} \cos\alpha_i \quad \text{Equation (7)}$$

$$\text{Where, } \alpha_i = \frac{y_{Ui} u_{ix} - x_{Ui} u_{iy}}{\sqrt{y_{Ui}^2 + x_{Ui}^2} \cdot \sqrt{u_{ix}^2 + u_{iy}^2}} \quad \text{Equation (8)}$$

By solving Equations (2)-(7) as a system of linear equations for the unknowns $F_1 \sim F_6$, the target force for each leg may be readily determined.

The aforementioned closed-loop control scheme will now be described in detail.

Figure 5:
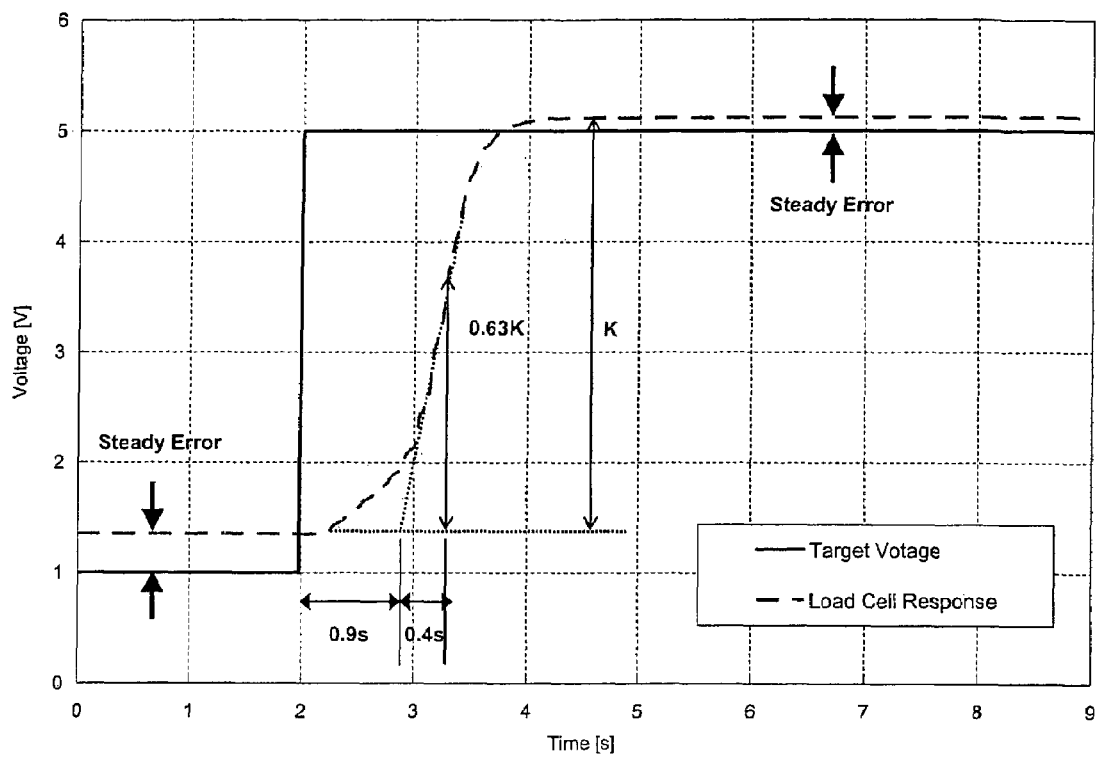
FIG. 5 is a graph illustrating the typical step response of the universal spring mechanism described in FIG. 1(a)

Referring to FIGS. 2 and 5, in order to design controller 78, a step response test may first be performed with universal spring mechanism 30 modeled as discussed below. Specifically, in order to design controller 78, a step response test may be performed individually on each actuator leg 38 for identification of mechanism 30. FIG. 5 shows the typical step response of universal spring mechanism 30 of FIGS. 1(a)-1(d). For FIG. 5, characteristics including delay, nonlinearity, and time constant may be attributable to factors such as the physical delay of the hydraulic valve for hydraulic cylinder 52, ramp generator in the hydraulic driver circuit (not shown), and signal conditioner of load cell 54. Because of the open loop control, steady state error may be observed due to friction between the rod and cylinder. The characteristics of universal spring mechanism 30 in Laplace domain $G^h(s)$ may be modeled as a delay and 1$^{st}$ order system as follows to adapt to classical control theory.

$$G(s) = e^{-sL_h} \cdot \frac{k_h}{1+sT_h} \qquad \text{Equation (9)}$$

Where the subscript h represents a hydraulic system related parameter. From the actual step response result, the parameters $L_h$, $k_h$ and $T_h$ may be estimated as 0.9, 0.67 and 0.4, respectively.

Based on the control system model discussed above, the following three controller design concepts may be implemented for controller 78 according to the present invention.

For the first controller design, an integrator element is necessary to make the system Type-1 so that the steady state position error reduces to zero. For the second controller design, a Lead-Lag controller may be applied to improve system response by pole replacement. Alternatively, for the third controller design, a Smith-predictor may be applied to equivalently move the delay component out of the closed control loop.

Figure 6:
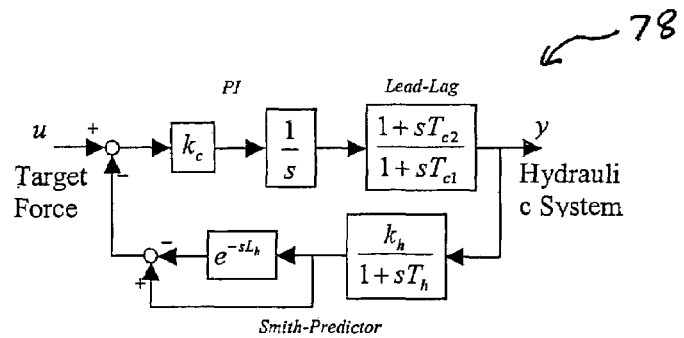
FIG. 6 is a block diagram for a controller according to the present invention.

By taking the aforementioned considerations into account, controller 78 may preferably be a PI+Lead-Lag-Controller with a Smith Predictor. A block diagram for controller 78 is shown in FIG. 6, where, the subscript c represents a controller related parameter, and $T_{c2}$ is set to the same value as $T_h$ for pole replacement. The aforementioned controller design provides improvement of the response for universal spring mechanism 30, as discussed below.

Implementation of the aforementioned closed-loop control scheme will now be described in detail.

For implementation, the state variable equation in continuous time domain for the proposed controller is expressed as follows:

$$\frac{dx_1}{dt} = k_c(u - x_3) \qquad \text{Equation (10a)}$$

$$\frac{dx_2}{dt} = \frac{T_1 - T_2}{T_1^2}x_1 - \frac{1}{T_1}x_2 \qquad \text{Equation (10b)}$$

$$\frac{dx_3}{dt} = -\frac{1}{T_h}x_3 + \frac{K_h}{T_h}(1 - \delta(t-L))y \qquad \text{Equation (10c)}$$

For implementation to Visual Basic code, the above-identified state variable equation may be converted to discrete time domain as follows:

$$x_1(n) = k_c\tau(u(n) - x_3(n)) + x_1(n-1) \qquad \text{Equation (11a)}$$

$$x_2(n) = \frac{1}{K_1}\left(\frac{T_{c1} - T_{c2}}{T_{c1}^2}\tau \cdot x_1(n) + x_2(n-1)\right) \qquad \text{Equation (11b)}$$

$$x_3(n) = \frac{1}{K_2}\left(\frac{k_h}{T_h}\tau\left(y(n) - y\left(n - \frac{L}{\tau}\right)\right) + x_3(n-1)\right) \qquad \text{Equation (11c)}$$

$$y(n) = \frac{T_{c2}}{T_{c1}}x_1(n) + x_2(n) \qquad \text{Equation (11d)}$$

Where, $K_1 = 1 + \frac{1}{T_h}\tau$, $K_2 = 1 + \frac{1}{T_h}\tau$, $\tau$ = Sampling Time.

Figure 7:
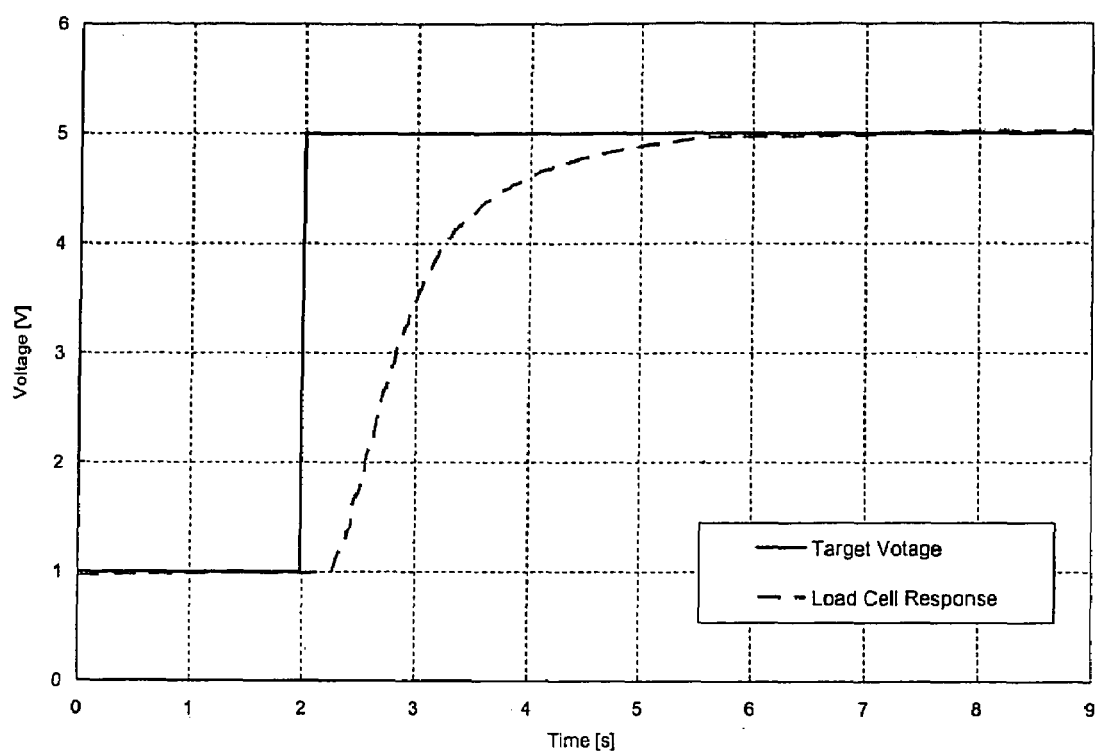
FIG. 7 is a graph illustrating an improved step response of the universal spring mechanism of FIG. 1(a)

After implementation of controller 78, the step response is improved as shown in FIG. 7. For the response of FIG. 7, it can be seen that although it takes longer for the output to settle, the output however is well maintained by the controller to follow the target voltage, which means that the corresponding force provided by each actuator leg 38 is also well maintained.

In order to determine the force line range using universal spring mechanism 30, the method according to the present invention may include the following eleven steps.

Figure 9:
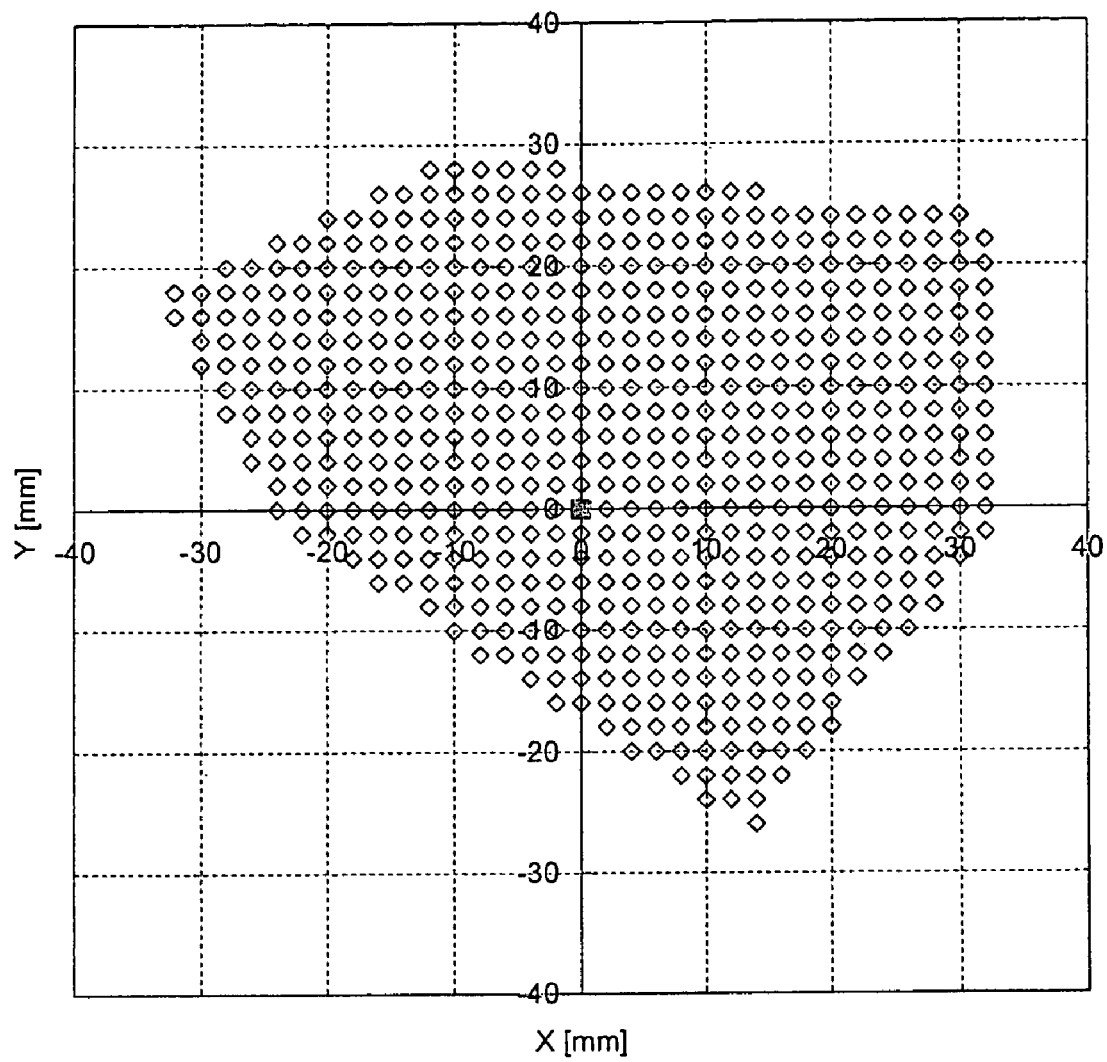
FIG. 9 is an exemplary graph of the realizable lower side force line position with the fixed upper force line position at the origin.

The first step may include performing a capability study of universal spring mechanism 30 to ensure the scannable force line position range for a given spring is large enough to cover the desired force line position range for a subject application. For example, referring to FIGS. 8 and 9, based upon the specific geometric information of universal spring mechanism 30 and vertical load specification provided by mechanism 30, the realizable force line range may be dynamically calculated by scanning the forces and torques generated by mechanism 30. FIG. 8 specifically shows an example of the realizable force line position for the upper side and the lower side (i.e. upper and lower seats 34, 36), respectively. Likewise, referring to FIG. 9, by fixing either the upper or lower force line positions to a specific value of interest, the realizable force line position of the other side can be dynamically calculated. FIG. 9 specifically shows an example of the realizable lower side force line position with the fixed upper force line position being at the origin.

With universal spring mechanism 30 mounted on a strut as shown in FIG. 1(a), each leg 38 may be installed between upper and lower seats 34, 36, with the installed locations being measured by a coordinate measurement machine (CMM). Each actuator leg 38 may produce a force of up to 3 KN for mechanism 30 illustrated for FIG. 1(a), which can be increased based on the power of the hydraulic pump used. In the mounting condition shown for FIG. 1(a), as discussed above, the adjustable force line position range may be computed as shown in FIG. 8 where the upper side range is smaller than the lower side range due to the smaller mounting area on the upper side. The implication of this fact is that the larger the spring seat, the larger the force line position variability becomes as the distribution of spring reaction force changes similarly.

It should be noted that the force line position ranges shown in FIG. 8 do not mean that the force line position can be adjusted to any combination in the range, but that the force line position can be distributed within that range under certain conditions. For example, if the upper position is fixed to (0,0), the adjustable range for the lower position is limited as shown in FIG. 9. Alternatively, if the range for force line investigation requires a larger adjustable range, the lower mounting area must be enlarged using a lower seat adapter. Thus the adjustable range is dependent on the actuator mounting positions and total vertical force only, not the maximum force provided by each leg.

For the second step for force line range determination, an appropriate mounting seat adapter may be designed for universal spring mechanism 30 to widen the scannable range if the aforementioned range is not wide enough. For example, if the aforementioned realizable force line range is not large enough, the mounting area of universal spring mechanism 30 may be enlarged until the realizable force line range of the force line is large enough to accommodate a specific application.

For the third step, as discussed earlier with reference to FIG. 3, the length of universal spring mechanism 30 may be adjusted by inserting a proper extension adapter 58 to fit the workable range of mechanism 30 to the spring height to be tested. If a height to be tested is longer than an individual leg 38 of mechanism 30, an extension 58 of an appropriate length may be used to correct the workable range of mechanism 30 to the height to be tested.

Referring to FIG. 2, for the fourth step, a desired coil spring force line position 74 may be determined.

For the fifth step, the corresponding total force field may be computed based upon the desired force line position 74 and dimensional configuration 76 of universal spring mechanism 30.

For the sixth step, universal spring mechanism 30 may be activated to generate the desired coil spring force line.

Figure 15:
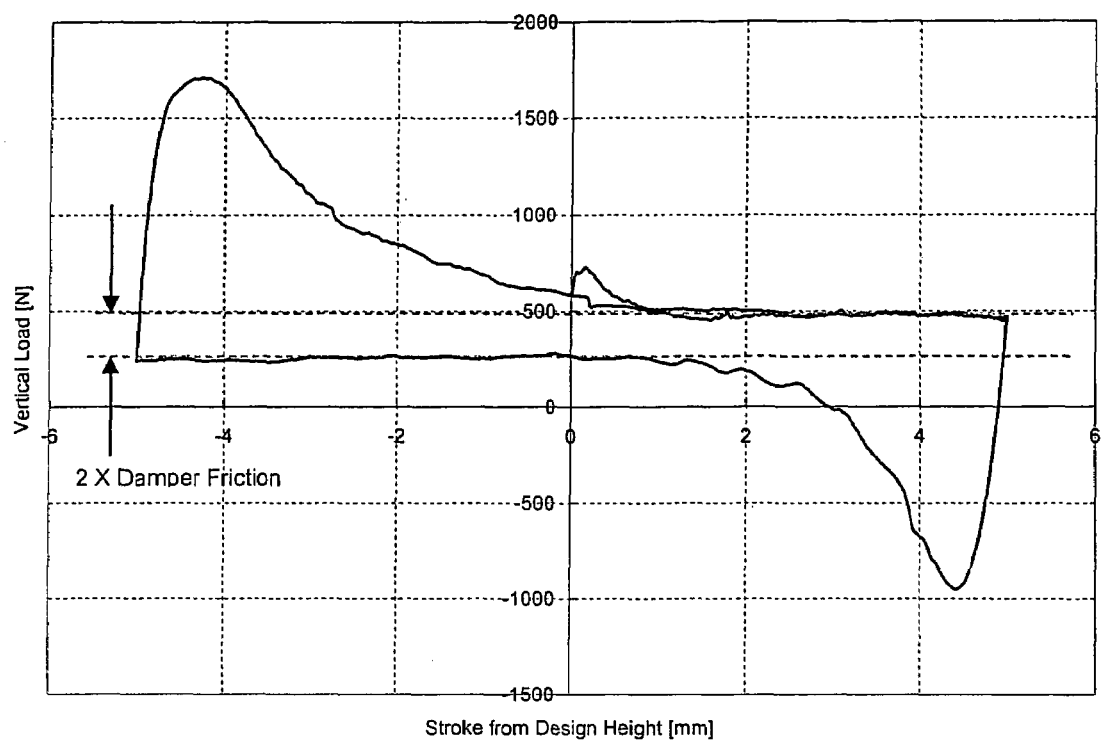
FIG. 15 is a graph illustrating typical load cell output during damper friction, according to the present invention.

For the seventh step, damper friction measurements (or other significant suspension attribute measurements) may be performed by inputting a quasi-static oscillation with small stroke to suspension system 32 of FIG. 1(*b*), for example. For damper friction measurement, the present invention uses a twin-tube type shock absorber with a separated type McPherson strut. Damper friction measurement may been performed under the experimental setup shown in FIGS. 1(*b*)-1(*d*), where the force line connecting the center of upper seat 34 and bottom seat 36 is not on the damper axis. The force line passes through the lower seat at (0, 18.5) in the aforementioned universal spring coordinate system. Therefore, it is expected that the damper friction would be minimized when the force line is set to (0, 0) for the upper and (0, 18.5) for the lower seats 34, 36, respectively. In order to find the optimal force line position and/or the acceptable range to limit damper friction, the system of FIG. 1(*a*) may be set in the actual vehicle mounting orientation. For the present invention, only the force lines on the Y-Z plane in the aforementioned universal spring coordinate system are discussed. The upper and lower Y-positions of the force line (Uy, Ly) may be swept in a range from −20 mm to +20 mm with 10 mm increment and 5 mm increment, respectively. Referring next to FIG. 15, there is illustrated a typical load cell output having hysteresis due to damper friction, for which the amount of the hysteresis corresponds to twice the friction force. Since universal spring mechanism 30 is always generating a consistent force, the load should not change during stroke. However, at the moment when the oscillating direction reverses, static friction in each leg 38 causes a large load change due to the reaction speed of controller 78. Once the friction stabilizes, the controller maintains the force again, which does not create a problem if the friction is measured in steady state.

For the eighth step, friction for damper 42 may be measured by reading the amount of hysteresis in the output curve of load cell 54.

For the ninth step, steps 4-8 discussed above may be iterated with various force line positions.

Figure 10:
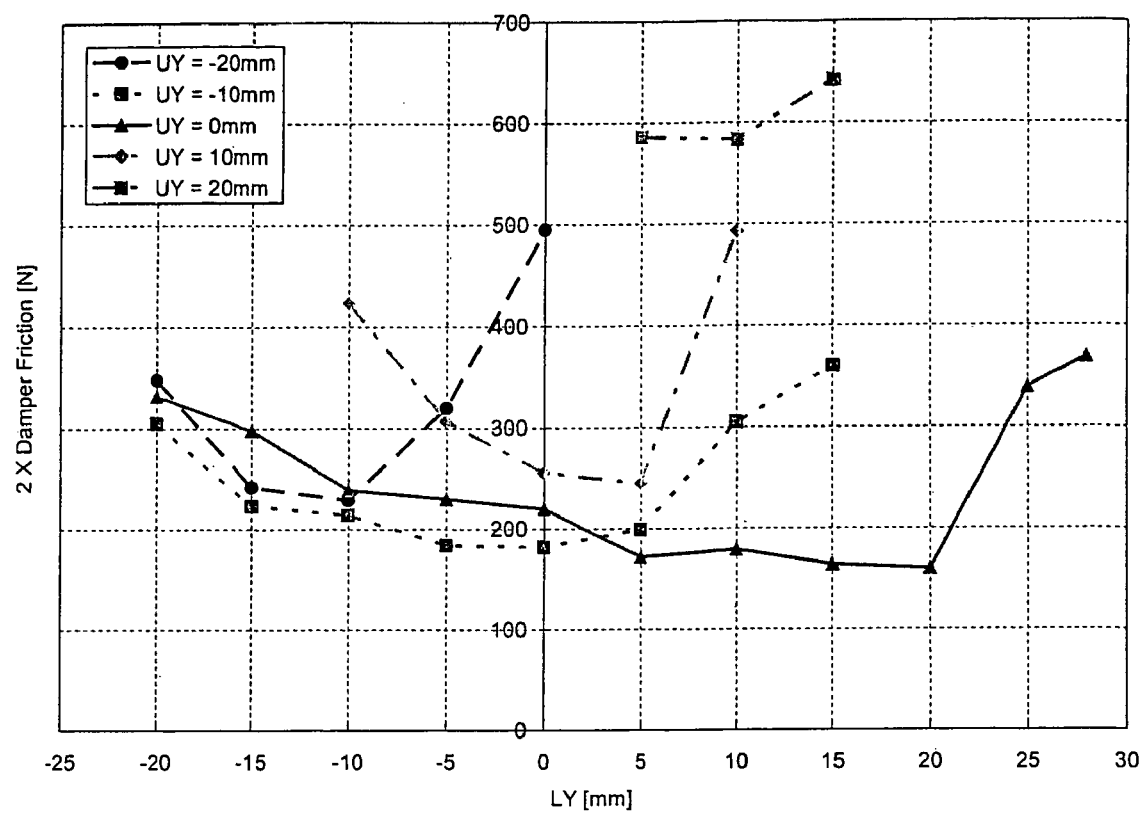
FIG. 10 is a graph illustrating the change in damper friction with various force line positions.

Referring to FIG. 10, for the tenth step for force line range determination, a friction map may be created according to the tested force line positions and measured output. The results of the damper friction measurement for damper 42 can be summarized as a plot shown in FIG. 10 for which each line corresponds to a different upper force line position (Uy) and how the damper friction changes when the lower force line position (Ly) is scanned. The example of FIG. 10 only shows the result when the force line is located on a certain vertical plane in FIGS. 1(*a*)-1(*d*). Alternatively, if the damper friction measurement is performed on multiple vertical planes for testing the force line, multiple plots may be generated. For multiple vertical planes, the force line position for minimizing the damper friction can be obtained from plots such as FIG. 10, which illustrates the change in damper friction with various force line positions on the Y-Z plane.

For the eleventh step, a range of the force line position that limits the damper friction to a certain value may be determined. There are four plot examples to find the force line position range corresponding to a certain damper friction range. From this experimental range, the coil spring force line position specification should be determined for optimizing the coil spring design for vehicle targets and manufacturing ability.

Figure 11:
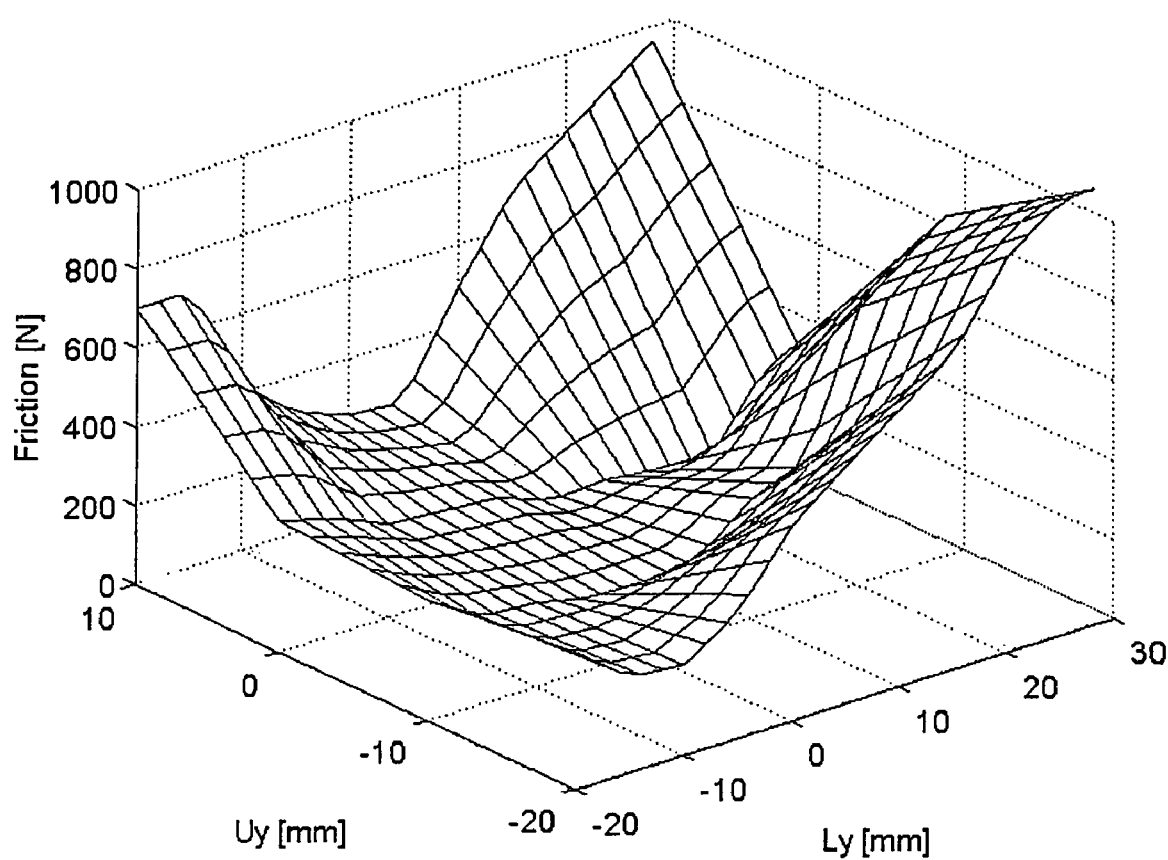
FIG. 11 is a graph illustrating three-dimensional visualization of damper friction according to the force line position.

Based upon the eleven steps for force line range determination discussed above, a first method for finding a force line range is by converting the plot of FIG. 10 to a 3D surface plot with surface interpolation as shown in FIG. 11, whereby the change in damper friction with respect to the force line position becomes visually understandable. The range below a specific constant friction plane (a horizontal plane bisecting the graph in FIG. 11) corresponding to certain friction values would thus be the acceptable force line range necessary to limit the damper friction to that certain value.

Figure 12:
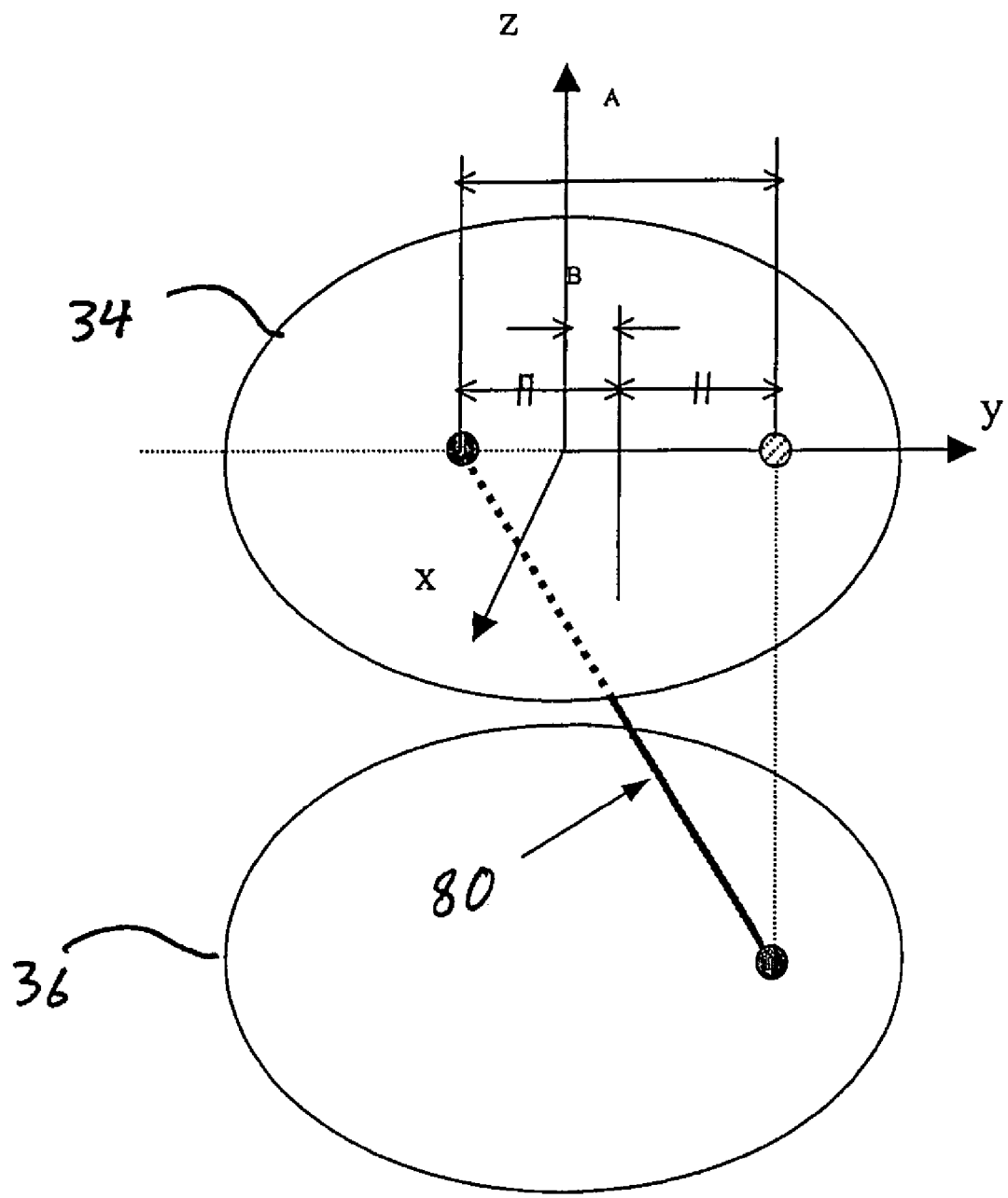
FIG. 12 is a graph illustrating definition of force line offset and inclination.

For the first method for finding a force line range discussed above, force line offset and inclination are important factors at the coil spring design stage, and are defined in FIG. 12. For force line 80, the origin of a coil spring coordinate system is at the center of upper seat 34. The lower force line position is a projection up to the X-Y plane of the coil spring coordinate system. The distance between the upper force line position and the lower force line position projection on the X-Y plane (shown as A in FIG. 12) is defined as the force line inclination. The distance to the center of the projected force line onto the X-Y plane from the origin (shown as B in FIG. 12) is defined as the offset of the force line.

Figure 13:
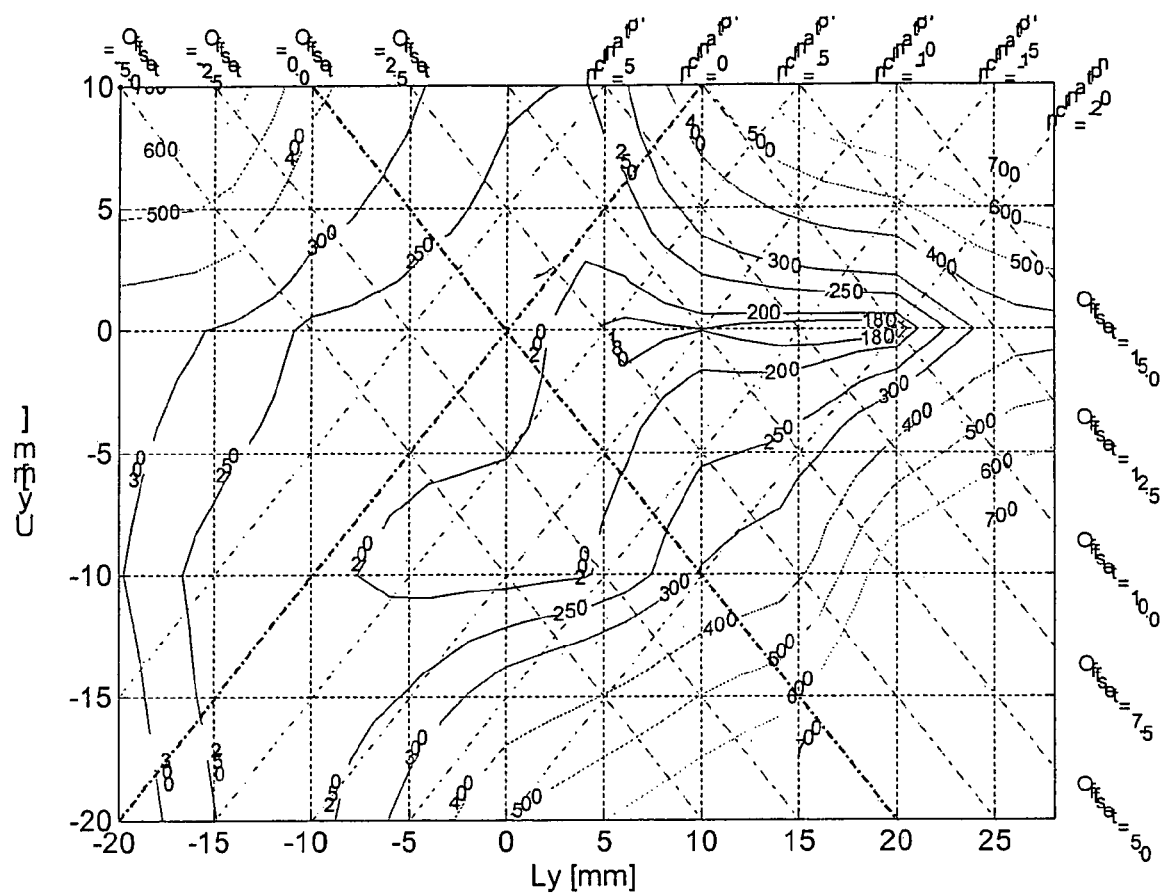
FIG. 13 is a graph illustrating a friction contour map.

A second method for finding a force line range that limits the damper friction to a certain value is to create a friction contour map as shown in FIG. 13. The plot for FIG. 13 can give additional numeric information about the force line range that limits the damper friction. The amount of offset and inclination of force line 80 can vary while limiting the damper friction. From the friction contour map of FIG. 13, the following may be obtained. First, the friction at (Ly, Uy)=(18.5, 0) is the minimum as expected. This validates the system is working correctly. Secondly, if the force line passes through the upper position (0, 0), the lower position can be distributed in a range from approximately (0, 5) to (0, 20) to limit the friction to 180N. Thirdly, if the force line inclination is between −5 mm and −11 mm, the friction is consistent even though the force line offset ranges from −5 mm to 5 mm.

Figure 14:
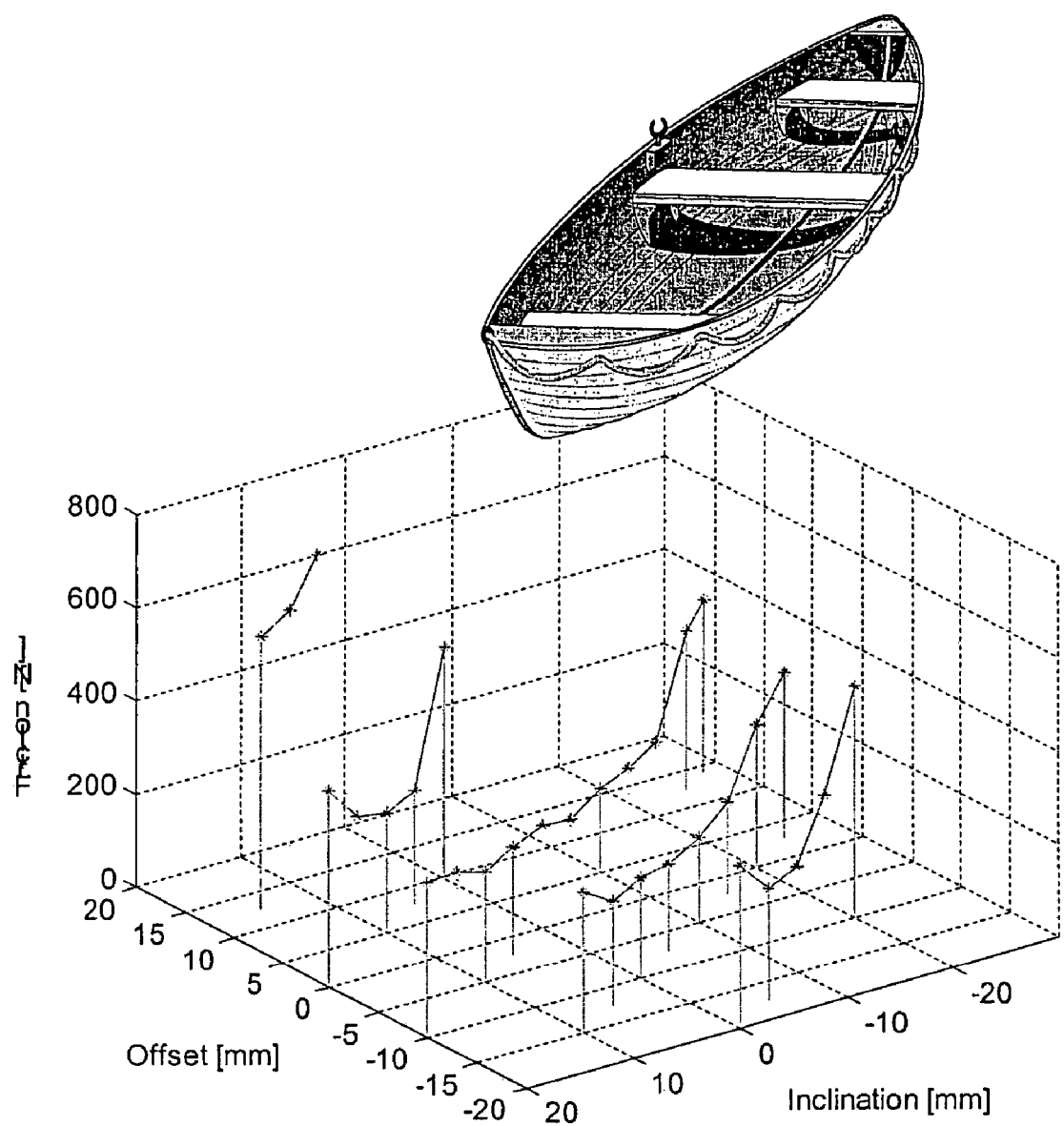
FIG. 14 is a graph illustrating the effect of force line offset and force line inclination on damper friction.

For a third method for finding a force line range, the plot of FIG. 13 may be re-plotted by referring to the offset and inclination axes as shown in FIG. 14. From the plot of FIG. 14, the change in friction with respect to spring force line offset and inclination is more obviously understandable. Force line offset may be defined as a distance between the middle point of the force line projected onto the plane of upper seat 34 and the origin. Force line inclination may be defined as a distance between the upper and lower force line positions projected onto the plane of upper seat 34. Therefore, spring side force is directly related to the force line inclination. FIG. 14 further shows that the damper friction depends on both inclination and offset. While there are many combinations that may provide an acceptable level of damper friction, the minimum friction is realized at only one location. If the resulting friction measurements were connected with a surface across a large offset/inclination domain, as in FIG. 14, that surface could be analogous to that of a boat hull as also shown in FIG. 14. The sides would extend upward towards infinitely high friction as the offset/inclination increases. The orientation in the inclination/offset plane of the boat hull-like surface may be determined, not by its rudder, but rather by the relative contribution of inclination versus offset to cancel the applied moment on damper 42 from the suspension geometry. Using this surface, it is possible to select the optimum force line inclination given a fixed offset condition. When designing a spring, if the spring offset is limited by space limitations or manufacturing capability, an optimal spring inclination can still be found to satisfy the ultimate requirement. To summarize, it does not make sense to only limit side force in order to control damper friction. Thus, the force line offset must also be taken into consideration. It should be noted that the resultant force line position is expressed in the Universal coordinate system, which requires conversion to the spring coordinate system for spring design.

Yet a further fourth method for finding a force line range is similar to re-plotting FIGS. 11 and 13, whereby it is possible to create to friction contour map based on FIG. 14 so that the allowable force line offset range and inclination range can be visually measured for spring force line design. From FIG. 14 and its contour map, the best inclination to target can be found while being subjected to a limited realizable offset due to manufacturability and limited packaging constraints.

The invention thus provides a 6-DOF programmable universal spring mechanism 30 to mimic spring characteristics by applying a Stewart Platform type parallel mechanism. Mechanism 30 may be used to experimentally find the ideal force line position and/or the range to limit damper friction from the riding comfort standpoint without making prototype springs, and can also be used to investigate any effects of the coil spring force line on vehicle self steering torque (SST). The aforementioned capabilities of universal spring mechanism 30 can be used not only to reduce coil spring design cycle time, but also to develop a specific force line for a particular suspension instead of using unrealistic, generalized force line bogeys. These design capabilities can compliment vehicle tuning to shorten and simplify the vehicle design process.

Although particular embodiments of the invention have been described in detail herein with reference to the accompanying drawings, it is to be understood that the invention is not limited to those particular embodiments, and that various changes and modifications may be effected therein by one skilled in the art without departing from the scope or spirit of the invention as defined in the appended claims.

What is claimed is:

1. A system for determining coil spring force line range corresponding to specific damper friction values using a force field generator mechanism to mimic a spring, said mechanism having spaced apart moveable platforms and at least one actuable link interconnecting the platforms at corresponding joints on opposite ends of the link, the determined force line range being used in coil spring design, said system comprising:
   a structure for securing said mechanism to a suspension system including a damper;
   a controller for controlling at least one link of said mechanism for exerting force between upper and lower platforms of said mechanism;
   a system for performing a capability study of said mechanism;
   a system for determining a desired coil spring force line position based upon said capability study;
   a system for performing damper friction measurements for determining a coil spring force line position for minimizing damper friction, wherein said system for performing said damper friction measurements includes a system for inputting an oscillation to said suspension system, a system for evaluating damper friction for a range of coil spring force line positions, and a system for selecting at least one of an optimal coil spring force line position and a range of coil spring force line positions for minimizing damper friction by sweeping upper and lower positions through a predetermined range;
   a system for determining said coil spring force line range based upon said damper friction measurements;
   a load cell mounted on said links for determining said damper friction;
   a system for evaluating a three-dimensional plot of damper friction; and
   a system for selecting a range of coil spring force line positions below a predetermined acceptable damper friction.

2. The system for determining coil spring force line range according to claim 1, wherein said system for determining said coil spring force line range includes:
   a system for evaluating a friction contour map of damper friction, said map including information regarding offset and inclination of said coil spring force line range; and
   a system for selecting a range of coil spring force line positions below a predetermined acceptable damper friction.

3. The system for determining coil spring force line range according to claim 1, wherein said system for determining said coil spring force line range includes:
   a system for evaluating damper friction as a function of offset and inclination of said coil spring force line range; and
   a system for selecting a range of coil spring force line positions below a predetermined acceptable damper friction.

* * * * *